United States Patent [19]

Ueyoko et al.

[11] Patent Number: 5,205,882
[45] Date of Patent: Apr. 27, 1993

[54] HEAVY DUTY HIGH SPEED RADIAL TIRE WITH AROMATIC POLYAMIDE BELT CORDS

[75] Inventors: Kiyoshi Ueyoko, Osaka; Shinichi Miyazaki, Kobe; Mikio Takatsu, Takarazuka; Masayoshi Nishitani, Kobe, all of Japan

[73] Assignee: Sumitomo Rubber Industries, Ltd., Kobe, Japan

[21] Appl. No.: 544,228

[22] Filed: Jun. 26, 1990

[30] Foreign Application Priority Data

Jun. 30, 1989 [JP] Japan .................................. 1-170689

[51] Int. Cl.$^5$ ........................... B60C 9/22; B60C 9/18; B60C 9/08
[52] U.S. Cl. ..................................... 152/527; 152/526; 152/531; 152/537; 152/556; 152/565; 156/910
[58] Field of Search ............... 152/451, 527, 531, 565, 152/526, 536, 556; 156/910

[56] References Cited

U.S. PATENT DOCUMENTS

| | | | |
|---|---|---|---|
| 4,448,813 | 5/1984 | Solomon ........................ | 156/910 X |
| 4,680,228 | 7/1987 | Sharma ......................... | 156/910 X |
| 4,807,682 | 2/1989 | Imai et al. ..................... | 152/556 X |
| 4,832,101 | 5/1989 | Welter .......................... | 152/556 X |
| 4,832,102 | 5/1989 | Domchick ....................... | 152/527 |
| 4,856,573 | 8/1989 | Morikawa et al. ................ | 152/556 |
| 4,872,497 | 10/1989 | Hanada et al. .................. | 152/556 X |
| 4,947,914 | 8/1990 | Noma et al. .................... | 152/531 |

FOREIGN PATENT DOCUMENTS

| | | | |
|---|---|---|---|
| 203889 | 6/1959 | Austria ............................ | 152/531 |
| 2829452 | 1/1980 | Fed. Rep. of Germany ...... | 152/531 |
| 1349247 | 12/1963 | France ............................ | 152/527 |
| 49-67959 | 7/1974 | Japan ............................. | 156/910 |
| 1487426 | 9/1977 | United Kingdom ................ | 152/531 |

OTHER PUBLICATIONS

*Mechanics of Pneumatic Tires,* ed. Samuel Clark: US Dept. of Transportation, Aug. 1981, pp. 81, 220-224. English translation.

Primary Examiner—Michael W. Ball
Assistant Examiner—Adrienne C. Johnstone

[57] ABSTRACT

A heavy duty high speed radial tire has a belt composed of at least one aromatic polyamide fiber cord ply, the product $T \cdot \sqrt{D}$ of the cable twist number T (turns/10 cm) of the belt cord and the square root of the total denier number D (deniers) of the cord is $2.466 \times 10^3$ to $3.036 \times 10^3$, and the elongation E (%) at breakage of the belt cord divided by the total denier number D is $7.78 \times 10^{-4}$ to $12.22 \times 10^{-4}$.

5 Claims, 1 Drawing Sheet

HEAVY DUTY HIGH SPEED RADIAL TIRE WITH AROMATIC POLYAMIDE BELT CORDS

The present invention relates to a heavy duty high speed radial tire, in which various tire performances such as structural durability and resistance to high internal pressure are improved.

Heavy duty high-speed radial tires, for example aircraft tires for jumbo jets which are typical thereof are required
- to have a durability against repeating large deformation since tire deformation when landing is very large,
- to have a resistance to high-speed running under severe loaded conditions,
- to withstand a very high internal pressure, for example 10 to 16 kgf/cm$^2$ since the designed pressure for such a tire is very high,
- to withstand a taxi condition in which the running speed is relatively low but the tire is subjected to a heavy load for a long time and
- to be increased in the cornering force to improve stability when the aircraft turns on the ground.

Recently, belted radial structures are widely used for such aircraft tires, and for the belt, nylon cords have been used rather than heavier steel cords to reduce the tire weight.

However, nylon cords are inferior in tensile strength, which results in an insufficient resistance to high internal pressure, and sometimes results in a poor resistance to wear under the recent severe service conditions.

Therefore, in the present invention, an aromatic polyamide fiber cord is used as the belt cord because the aromatic polyamide fiber cords have a very large tensile strength and a very high modulus like a steel cord, but the specific gravity is as light as nylon.

However, the results when the prior aromatic polyamide fiber cords were used for the belt were not as good as expected since the prior aromatic polyamide fiber cords are broken relatively easily when folded (when the tire is greatly deformed), and the adhesion to rubber is inferior due to its high degree of crystallization.

It is therefore, an object of the present invention to provide a heavy duty high speed belted radial tire, in which various tire performances such as structural durability, resistance to high internal pressure, cornering performance and the like are improved by using aromatic polyamide fiber cords for the belt structure.

SUMMARY OF THE INVENTION

According to one aspect of the present invention, a heavy duty high speed radial tire comprises
- a pair of bead cores disposed one in each bead portion of the tire,
- a carcass turned up around the bead cores and composed of at least one ply of cords laid at angles of no less than 75 degrees and no more 90 degrees with respect to the tire equator, and
- a belt structure disposed radially outside the carcass and radially inside a rubber tread and composed of at least one ply of aromatic polyamide fiber cord or cords, wherein the twist coefficient TN of the belt cord, which is defined as the product $T \cdot \sqrt{D}$ of the cable twist number T (turns/10 cm) of the cord and the square root of the total denier number D (deniers) of the cord, is not less than $2.466 \times 10^3$ and not more than $3.036 \times 10^3$.

Preferably, the elongation E (%) at breakage of the belt cord divided by the total denier number D of the cord, is set to be not less than $7.78 \times 10^{-4}$ and not more than $12.22 \times 10^{-4}$. Further, the adhesion of the belt cord to its topping rubber is not less than 21.0 kgf/cm.

DESCRIPTION OF THE PREFERRED EMBODIMENT

Figure 1:
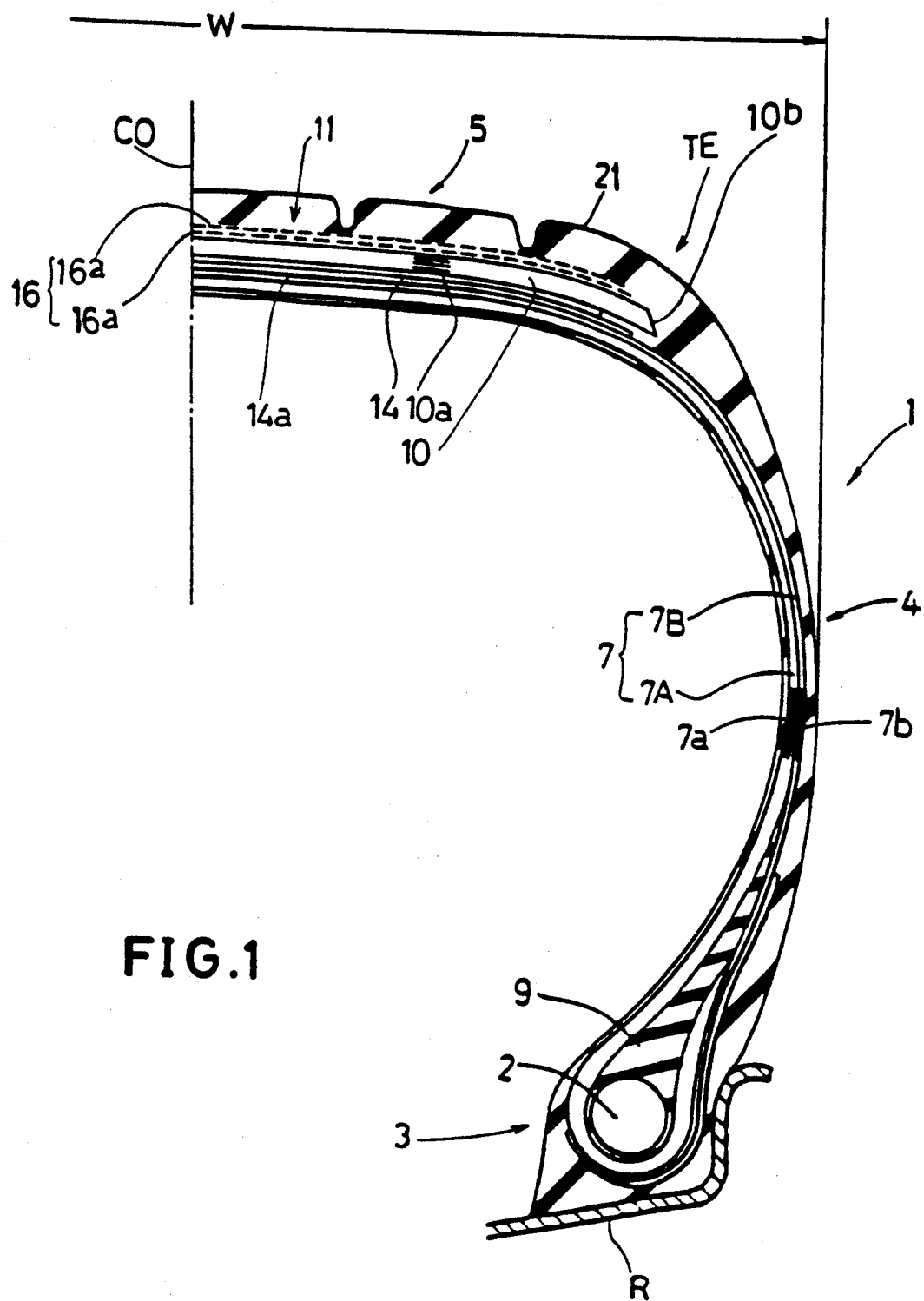
FIG. 1 shows a right half of an embodiment of the present invention.

An embodiment of the present invention will now be described in detail with reference to the drawing, in which FIG. 1 is a sectional view showing a right half of an embodiment of the present invention.

In the drawing, the radial tire 1 is an aircraft tire of size 46×17R20, and the tire is mounted on a regular rim R and inflated to a normal pressure.

The tire 1 has a pair of bead portions 3, a tread portion 5 and a pair of sidewall portions 4. The tire 1 comprises a pair of bead cores 2 disposed one in each bead portion and a carcass 7 extending between the bead portions through the sidewall portions and the tread portion.

The carcass 7 in this embodiment comprises an inner layer 7A and an outer layer 7B.

The inner layer 7A composed of plural plies 7a, in this example four plies, each turned up around the bead cores from the inside to the outside of the tire.

The outer layer 7B is composed of plural plies 7b, in this example two plies, each turned up around the bead cores from the outside to the inside of the tire so as to wrap the turned up portions of the inner layer 7A.

Each of the carcass plies 7a and 7b is composed of cords arranged radially of the tire at angles of 75 to 90 degrees to the tire equator, and in this embodiment the cords are inclined with respect to the tire equator at 85 degrees so that the cords of each of the carcass plies 7a and 7b cross the cords of the adjacent carcass ply, whereby the lateral rigidity of the tire is increased.

The bead portions are each provided radially outside the bead core with a rubber bead apex 9, which extends radially outwardly and taperingly from the bead core to increase the bead rigidity.

The tread portion is provided with a belt structure 11 between the carcass and a rubber tread disposed on the carcass.

The belt structure 11 in this embodiment is composed of three layers of a band 10, a breaker 14 and a protector 16. The band is located in the center thereof, and the breaker 14 is disposed between the band and the carcass, and the protector is disposed between the band and the tread.

The band 10 comprises plural plies 10a of cords arranged at no more than 5 degrees to the tire equator CO since the main part thereof is a hoop for the tread portion.

The widths of the band plies 10a are decreased gradually in the radially outward direction as shown in FIG. 1, and thereby the side profile 10b of the band 10 as a whole is inclined almost parallel with the outer surface of the tire buttress part, namely, an upper part of the sidewall portion.

The maximum width of the band 10, that is, the width of the radially innermost widest ply 10a in this example, is 65 to 85% of the section width W of the tire.

In connection with the cord angles, the band plies 10a (cords) are inclined in the reverse direction in turns with respect to the tire equator.

The above-mentioned breaker 14 is to increase the rigidity of the tread portion in the widthwise direction of the tread to improve the cornering force of the tire.

The breaker cords are preferably arranged so as to form a triangular structure in combination with the carcass cords and the above-mentioned band cords are respectively inclined at 75 to 90 degrees and no more than 5 degrees as explained above.

Therefore, the breaker 14 is composed of at least one ply 14a of cords arranged at 0 to 70 degrees with respect to the tire equator, more preferably 10 to 30 degrees. In this example the breaker is composed of two plies of cords laid at 19 degrees and the plies are inclined in the reverse direction in turns with respect to the tire equator. However, when the inclination of the carcass plies are relatively great, for example the carcass cord angle to the tire equator is 75 to 80 degrees, the inclination of the breaker cords may be set at almost 0 degrees to the tire equator.

Preferably, the breaker is formed at a narrower width than the band 10, and the edges of the breaker ply 14a are respectively terminated beneath the edge portions of the band and axially inside the edges of the band. However, it may be possible to terminate the breaker ply edges so as to align with the band edges or so as to project slightly therefrom.

Thus, by the breaker 14 itself and moreover by the resultant triangular cord structure, the tread rigidity in the widthwise direction of the tread is increased to improve the cornering force, and further the structural durability can be improved.

The protector 16 is to provide a resistance to cutting from the outside of the tire, and at the same time bridges the difference in rigidity between the rubber tread and the band to mitigate the shearing stress therebetween.

The protector is composed of at least one ply of cords laid at larger angles than the band cord angle, in this embodiment two plies 16a of cords arranged at 27 degrees to the tire equator.

The belt cords of the belt structure, in this embodiment the cords of the band and breaker plies, are the same cords composed of twisted aromatic polyamide fiber strands, wherein the twist coefficient TN of the cord is not less than $2.466 \times 10^3$ and not more than $3.036 \times 10^3$. Here, the twist coefficient TN is defined as the product $T \cdot \sqrt{D}$ of the cable twist number T (turns/10 cm) multiplied by the square root of the total denier number D (deniers) of the cord.

In the case that the twist coefficient is less than $2.466 \times 10^3$, the elongation of the cord is small, and the cornering performance of the tire is deteriorated. In the case that the coefficient is more than $3.036 \times 10^3$, the elongation of the belt cord becomes large to lower the hooping effect of the belt structure, which results in loss of resistance to ply separation and thereby the structural durability is deteriorated.

Further, in this embodiment, the elongation E (%) of the belt cord when broken by increasing the cord load divided by the above-mentioned total denier number D, is preferably not less than $7.78 \times 10^{-4}$ and not more than $12.22 \times 10^{-4}$. If the quotient E/D is less than $7.78 \times 10^{-4}$, the stretch of the belt when the tire is inflated is small, which results in a decrease in the ability to mitigate compressive stress which acts in the tread portion and the bead portions when the tire is deformed. On the other hand, if E/D is more than $12.22 \times 10^{-4}$, the stretch of the belt becomes so large that the problem of belt edge separation occurs.

The belt cords are topped by a rubber to form the band ply 10a and the breaker ply 14a, and similarly protector plies 16a are formed.

The topping rubber has to possess not only a low heat-generating characteristic but also an appropriate stiffness not to disturb the above-mentioned characteristics of the belt cord. For this purpose, a rubber composition having such elastic characteristics that the 100% modulus is 30 to 70 kgf/cm$^2$ and the elongation at rupture is not less than 200% and not more than 500%, is preferably used. Further the base material of the rubber composition is composed of one or more materials selected from natural rubber and synthetic isoprene rubber. Furthermore, the content of carbon black in the rubber composition is 50 to 70 parts by weight.

When the carbon content is less than 50 parts by weight, the composition can not be reinforced. When the content exceeds 70 parts by weight, the heat-generation has a tendency to increase.

Further, when the 100% modulus is less than 30 kgf/cm$^2$, the heat-generation has a strong tendency to increases. Contrary, heat-generation has a strong tendency to increases. Contrary, when it exceeds 70 kgf/cm$^2$, the strength has a tendency to decrease.

Furthermore, when the elongation at breakage is less than 200%, breakage of the rubber is apt to be caused when deformation of the tire is very large. When it is more than 500%, the heat generation increases.

In general, aromatic polyamide fiber cords have a superior strength and a very low extensibility, but involve a problem that adhesion to the topping rubber is smaller when compared with nylon fiber cords and aliphatic polyamide fiber cords, which problem has obstructed their use.

In a heavy duty high speed radial tire for aircraft or the like, if the adhesion is less than about 21.0 kgf/cm, a rubber separation might occur in a high-speed rotation under a heavy load and a large deformation, and thus, it can not be adopted for such a use.

Table 1 shows a treating method (so called double dipping) for a nylon or aliphatic polyamide fiber cord, by which the adhesion of the nylon or aliphatic polyamide fiber cord to the topping rubber is effectively improved, but in the aromatic polyamide fiber cord, this method is ineffective, and adhesion more than 21.0 kgf/cm can not be obtained.

However, we found an effective method of treating the aromatic polyamide fiber cord, through which the adhesion to the topping rubber becomes the same level as nylon or aliphatic polyamide fiber cords, or more improved, and thereby it becomes possible to use aromatic polyamide fiber cords for the belt cord.

Table 2 shows this improved treating method, in which the aromatic polyamide fiber cord is treated by the 1st dipping process twice continuously and then the 2nd dipping process twice continuously.

Further, in this embodiment, for the carcass cords, the same aromatic polyamide fiber cord as the above-mentioned belt cord is used. However, a single material cord or a hybrid cord composed of plural materials, of which material or materials are selected from extensible organic fibers such as aromatic polyamide, nylon, polyester and the like; carbon fibers; and metallic wires such as steel, may be used. In each of the carcass plies 7a and 7b, the carcass cords are embedded in the topping rubber.

Furthermore, the above-mentioned band plies 10a in this embodiment are formed by a cord winding method. That is, one or more cords are wound spirally and continuously from one tread edge TE to the other tread edge TE. By employing such a cord winding method, the hooping effect of the band is remarkably improved to increase the rigidity of the tread portion.

Preferably, the cord thickness in each ply is varied so that the thickness is larger in the central part than the edge parts. Therefore, the central part of the tread portion in which the largest expansive force acts is largely strengthened than the edge parts, and as a result the strength of the tread portion is evened, and the tire weight can be reduced.

COMPARISON TESTS

According to the specifications shown in Table 3, belt cords for a 46×17R20 aircraft tire shown in FIG. 1 were made to compare their adhesions. The test results are shown in the same Table 3, wherein the adhesion of aromatic polyamide fiber cord A was increased 14% in comparison with aromatic polyamide fiber cord C, and demonstrated approximately equal adhesion to nylon fiber cord B.

Test tires which were aircraft tires of 46×17R20 size having a structure shown in FIG. 1 were made in order to test their durability, heat generation and resistance to high internal pressure. The specifications of the test tires are given in Table 4.

Durability Test: according to TSO-C62c, Technical Standard Order of the U.S. Federal Aviation Administration, a high-speed take-off cycle test and a taxi cycle test were made to evaluate the durability of each test tire. The total running distance of the tire until any tire failure was occurred was measured as durability. The results are indicated by index in Table 4.

Heat Generation Test: applying a speed and a load corresponding to the normal service condition and using a tester, temperature was measured at the tread portion, sidewall portion and bead portion of each test tire.

Over Pressure Test: test tire was filled with water, and the water pressure was increased to cause any tire failure. The results are shown in Table 4.

As described above, the belt cords are made of aromatic polyamide fibers and characterized in that the twist coefficient TN is set to in the range of $2.466 \times 10^3$ to $3.036 \times 10^3$, the elongation E (%) at breakage divided by the total denier number D is in the range of $7.78 \times 10^{-4}$ to $12.22 \times 10^{-4}$, and the adhesion of the belt cord to the topping rubber is not less than 21.0 kgf/cm.

Therefore, the hooping effect of the belt structure is effectively improved, and the tire can withstand a high internal pressure. Further, as the belt structure is provided with a proper high extensibility, separation failure such as belt edge looseness can be prevented even under severe service conditions such as high-speed and heavy load and high internal pressure. Accordingly, the tire is improved in the structural durability, together with various performances such as cornering performance.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

TABLE 1

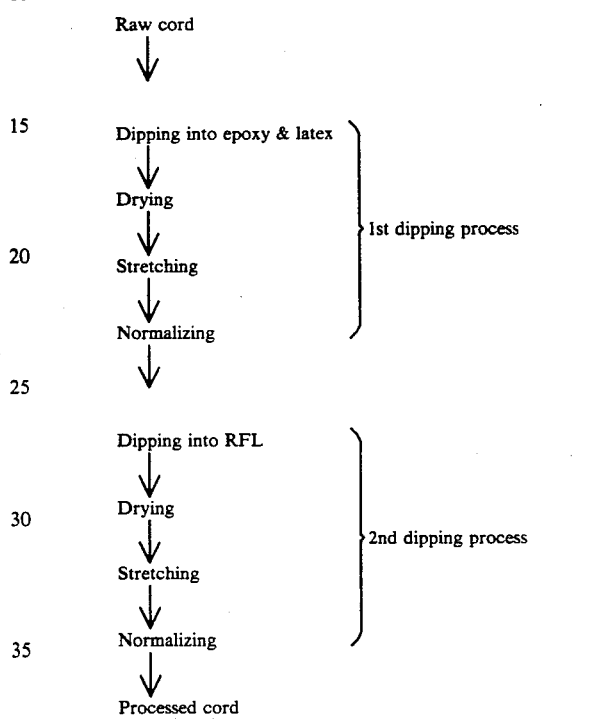

TABLE 2

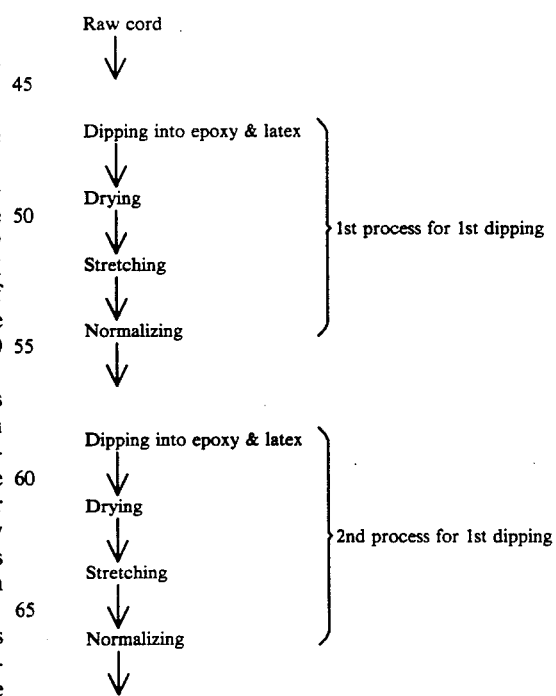

TABLE 2-continued

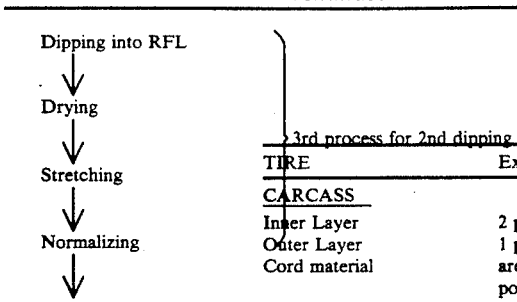

TABLE 3

| Cord | A | B | C |
| --- | --- | --- | --- |
| Material | aromatic polyamide fibers (3000d/3) | nylon fibers (1890d/3) | aromatic polyamide fibers (3000d/3) |
| Total denier D | 9000 | 5670 | 9000 |
| Cable twist T (turns/10 cm) | 30 | 34 | 22 |
| Twist coefficient $TN = T \cdot \sqrt{D}$ | $2.846 \times 10^4$ | $2.56 \times 10^4$ | $2.087 \times 10^4$ |
| Strength (kgf) | 129.0 | 48.0 | 150.0 |
| Elongation at breakage E (%) | 9.0 | 28.0 | 60 |
| E/D | $10 \times 10^{-4}$ | $49.38 \times 10^{-4}$ | $6.67 \times 10^{-4}$ |
| Thickness d (mm) | 1.29 | 1.05 | 1.25 |
| Ends per 50 mm | 33 | 42 | 33 |
| Treating method | Table 2 | Table 1 | Table 1 |

TABLE 3-continued

| Cord | A | B | C |
| --- | --- | --- | --- |
| Adhesion (kgf/cm) | 23.8 | 24.5 | 20.9 |

TABLE 4

| TIRE | Ex. 1 | Ref. 1 | Ref. 2 | Ref. 3 | Ref. 4 | Ref. 5 |
| --- | --- | --- | --- | --- | --- | --- |
| CARCASS | | | | | | |
| Inner Layer | 2 plies | 4 plies | 2 plies | 2 plies | 2 plies | 2 plies |
| Outer Layer | 1 ply | 2 ply | 1 ply | 1 ply | 1 ply | 1 ply |
| Cord material | aromatic polyamide fibers | nylon fibers | aromatic polyamide fibers | aromatic polyamide fibers | aromatic polyamide fibers | aromatic polyamide fibers |
| BAND | 4 plies | 9 plies | 3 plies | 3 plies | 8 plies | 3 plies |
| Cord material | aromatic polyamide fibers | nylon fibers | aromatic polyamide fibers | aromatic polyamide fibers | nylon fibers | aromatic polyamide fibers |
| BREAKER | 2 plies | Absent | 2 plies | 2 plies | 2 plies | 2 plies |
| Cord material | aromatic polyamide fibers | | aromatic polyamide fibers | aromatic polyamide fibers | nylon fibers | aromatic polyamide fibers |
| PROTECTOR | Present | Present | Absent | Absent | Absent | Absent |
| Durability | 200 | 200 | 10 | 70 | 20 | 20 |
| Temperature (degs.) | | | | | | |
| Tread part | 89 | 80 | 96 | 91 | 85 | 67 |
| Shoulder part | 81 | 72 | 86 | 66 | 105 | 109 |
| Bead part | 65 | 70 | 111 | 100 | 104 | 94 |
| Over-pressure Resistance (kgf/sq.cm) | 81.0 (Belt ply broken) | 67.5 (Sidewall broken) | | 40–60 (Belt ply broken) | | |
| Tire weight (kg) | 71.7 | 77.0 | 73.8 | 74.6 | 74.5 | 73.4 |

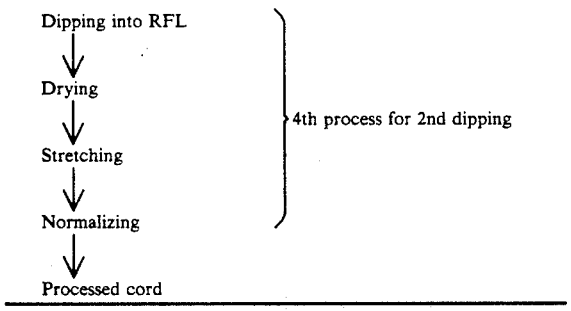

We claim:

1. A heavy duty high speed radial tire comprising:
   a pair of bead portions, each with a bead core disposed therein,
   a carcass turned up around said bead cores and composed of at least one ply of carcass cords laid at angles in a range from 75 degrees to 90 degrees with respect to the tire equator; and
   an aromatic polyamide fiber cord belt structure disposed radially outside the carcass and inside a rubber tread, said belt structure comprising
   a breaker disposed radially outside the carcass and composed of at least one ply of the aromatic polyamide fiber belt cords laid at angles of from 10 to 30 degrees to the tire equator, and
   a band disposed radially outside the breaker and composed of a plurality of plies of at least one aromatic polyamide fiber belt cord wound spirally and continuously from one edge to the other edge thereof to be laid at an angle of from 0 to 5 degrees to the tire equator,
   the product $T\sqrt{D}$ of the cable twist number T (turns/10 cm) of the belt cord and the square root of the total denier number D (deniers) of the belt cord, being in a range from $2.466 \times 10^3$ to $3.036 \times 10^3$,
   the elongation E (%) at breakage of the belt cord divided by the total denier number D of the belt cord, being in a range from $7.78 \times 10^{-4}$ to $12.22 \times 10^{-4}$,
   said carcass cords being aromatic polyamide fiber cords,
   the product $T\sqrt{D}$ of the cable twist number T (turns/10 cm) of the carcass cord and the square root of the total denier number D (deniers) of the carcass cord, being in a range from $2.466 \times 10^3$ to $3.036 \times 10^3$, and
   the elongation E (%) at breakage of the carcass cord divided by the total denier number D of the carcass cord, being in a range from $7.78 \times 10^{-4}$ to $12.22 \times 10^{-4}$.

2. The radial tire according to claim 1, wherein the 100% modulus of topping rubber of the belt cord is in the range of 30 to 70 kgf/sq. cm.

3. The radial tire according to claim 1, wherein the 100% modulus and elongation at breakage of topping rubber of the belt cord are in the range of 30 to 70 kgf/sq. cm and 200 to 500%, respectively.

4. A heavy duty high speed radial tire according to claim 1, wherein the thickness of the wound belt cord in said band is larger at the tire equator than at the edge parts of the band.

5. A heavy Duty high speed radial tire according to claim 1, wherein the adhesion of the belt cord to a belt topping rubber is not less than 21.0 kgf/cm.

* * * * *